(12) United States Patent
Sato et al.

(10) Patent No.: US 7,952,838 B2
(45) Date of Patent: May 31, 2011

(54) READ HEAD FOR MAGNETIC STORAGE SYSTEM

(75) Inventors: Naoki Sato, Tokyo (JP); Yasuyuki Ito, Tokyo (JP)

(73) Assignee: Marvell Intenational Ltd., Hamilton (BM)

( * ) Notice: Subject to any disclaimer, the term of this patent is extended or adjusted under 35 U.S.C. 154(b) by 997 days.

(21) Appl. No.: 11/825,561

(22) Filed: Jul. 6, 2007

(65) Prior Publication Data

US 2008/0007875 A1  Jan. 10, 2008

Related U.S. Application Data

(60) Provisional application No. 60/819,075, filed on Jul. 7, 2006.

(30) Foreign Application Priority Data

Jun. 5, 2007 (JP) .................. 2007-149134
Jun. 5, 2007 (JP) .................. 2007-149135

(51) Int. Cl.
*G11B 5/39* (2006.01)
(52) U.S. Cl. ...................................... 360/319
(58) Field of Classification Search ............ 360/319
See application file for complete search history.

(56) References Cited

U.S. PATENT DOCUMENTS

| | | | |
|---|---|---|---|
| 6,014,296 A | | 1/2000 | Ichihara et al. |
| 6,278,591 B1* | | 8/2001 | Chang et al. .................. 360/317 |
| 6,525,913 B1* | | 2/2003 | Mauri et al. ................... 360/320 |
| 6,636,396 B1* | | 10/2003 | Gill ............................ 360/324.12 |
| 6,751,845 B2* | | 6/2004 | Gill ............................. 29/603.14 |
| 7,061,728 B2* | | 6/2006 | Pinarbasi ...................... 360/320 |
| 7,064,938 B2* | | 6/2006 | Pinarbasi ................. 360/324.12 |
| 2005/0193405 A1 | | 9/2005 | Hattori et al. |
| 2006/0132970 A1 | | 6/2006 | Takai et al. |
| 2007/0285816 A1 | | 12/2007 | Deeman et al. |

FOREIGN PATENT DOCUMENTS

JP  2007-149134  6/2007
JP  2007-149135  6/2007

OTHER PUBLICATIONS

Kaitsu et al; "Ultra High Density Perpendicular Magnetic Recording Technologies"; Jan. 2006; pp. 122-130.

* cited by examiner

*Primary Examiner* — Mark Blouin

(57) ABSTRACT

A read head for a rotating magnetic storage system including concentric tracks is disclosed. The read head comprises a magnetoresistive (MR) sensor that reads information from a read track of the magnetic storage medium. First and second shields have a length greater than two tracks in a track width direction and define a gap therebetween, wherein the MR sensor is arranged in the gap. Inner magnetic portions of the first and second shields are spaced a first distance from the read track. Outer magnetic portions of the first and second shields are spaced a second distance from adjacent tracks to the read track, wherein the first distance is less than the second distance.

19 Claims, 12 Drawing Sheets

READ HEAD FOR MAGNETIC STORAGE SYSTEM

CROSS-REFERENCE TO RELATED APPLICATIONS

This application claims the benefit of U.S. Provisional Application No. 60/819,075, filed on Jul. 7, 2006. This application claims the benefit of JP 2007-149134, filed Jun. 5, 2007 and JP 2007-149135, filed Jun. 5, 2007. This application is related to U.S. patent application Ser. No. 11/835,587, filed on Jul. 6, 2007.

The disclosures of the above applications are incorporated herein by reference in their entirety.

FIELD

The present disclosure relates to magnetic storage systems and more particularly read heads for magnetic storage systems.

BACKGROUND

The background description provided herein is for the purpose of generally presenting the context of the disclosure. Work of the presently named inventors, to the extent it is described in this background module, as well as aspects of the description that may not otherwise qualify as prior art at the time of filing, are neither expressly nor impliedly admitted as prior art against the present disclosure.

Rotating magnetic storage systems such as disk drives read and write data on concentric tracks of magnetic storage media. Some magnetic storage systems use horizontal magnetic recording, which magnetizes the magnetic storage medium in a direction that is parallel with a plane defined by the magnetic storage medium. Other magnetic storage systems magnetize the magnetic storage medium in a direction that is perpendicular to the plane. When reading a track, signals sensed by the read head may be adversely impacted by crosstalk from adjacent tracks. This problem may increase as run length increases. Run length refers to the consecutive number of adjacent symbols stored on a track that are the same.

SUMMARY

A read head for a rotating magnetic storage medium including concentric tracks comprises a magnetoresistive (MR) sensor that reads information from a read track of the magnetic storage medium. First and second shields have a length greater than two tracks in a track width direction and define a gap therebetween, wherein the MR sensor is arranged in the gap. Inner magnetic portions of the first and second shields are spaced a first distance from the read track. Outer magnetic portions of the first and second shields are spaced a second distance from adjacent tracks to the read track, wherein the first distance is less than the second distance.

In other features, the first and second shields further comprise outer non-magnetic portions that are arranged between the outer magnetic portions and the adjacent tracks. The outer non-magnetic portions are spaced the first distance from the adjacent tracks. The inner magnetic portions comprise a projection and the outer magnetic portions define a concave surface relative to a direction of the projection. A thickness of inner edges of the outer magnetic portions adjacent to the inner magnetic portions is one of greater than or less than a thickness of outer edges of the outer magnetic portions. The inner portions include a projection and the first and second shields include a first side that faces the read track and second and third sides that face the inner and the outer magnetic portions of the adjacent tracks. The inner magnetic portions have a trapezoidal shape in a disk-facing direction. Circumferential sides of the trapezoid slope inwardly towards the MR sensor and cross an inner circumference side of an outer adjacent track and an outer circumference side of an inner adjacent track.

A rotating magnetic storage system comprises the read head and further comprises the magnetic storage medium, a write head that writes information to a write track of the magnetic storage medium, a sampling module that samples a voltage waveform, which is based on a resistance of the MR sensor, and a read channel module for reproducing the information recorded on the read track based on the sampled voltage waveform.

In other features, the magnetic storage medium has perpendicular anisotropy. The magnetic storage medium includes shield portions that are radially offset from and arranged between adjacent tracks.

A read head for a rotating magnetic storage medium including concentric tracks comprises magnetoresistive (MR) sensing means for sensing information from a read track of the magnetic storage medium. First and second shield means for shielding have a length greater than two tracks in a track width direction and define a gap therebetween. The MR sensing means is arranged in the gap. Inner magnetic portions of the first and second shield means are spaced a first distance from the read track. Outer magnetic portions of the first and second shield means are spaced a second distance from adjacent tracks to the read track, wherein the first distance is less than the second distance.

In other features, the first and second shield means further comprise outer non-magnetic portions that are arranged between the outer magnetic portions and the adjacent tracks. The outer non-magnetic portions are spaced the first distance from the adjacent tracks. The inner magnetic portions comprise a projection and the outer magnetic portions define a concave surface relative to a direction of the projection. A thickness of inner edges of the outer magnetic portions adjacent to the inner magnetic portions is one of greater than or less than a thickness of outer edges of the outer magnetic portions. The inner portions include a projection and the first and second shield means include a first side that faces the read track and second and third sides that face the inner and the outer magnetic portions of the adjacent tracks. The inner magnetic portions have a trapezoidal shape in a disk-facing direction. Circumferential sides of the trapezoid slope inwardly towards the MR sensing means and cross an inner circumference side of an outer adjacent track and an outer circumference side of an inner adjacent track.

A rotating magnetic storage system comprises the read head and further comprises the magnetic storage medium, write means for writing information to a write track of the magnetic storage medium, sampling means that samples a voltage waveform, which is based on a resistance of the MR sensing means, and read channel means for reproducing the information recorded on the read track based on the sampled voltage waveform.

In other features, the magnetic storage medium has perpendicular anisotropy. The magnetic storage medium includes shield portions that are radially offset from and arranged between adjacent tracks.

A method for providing a read head for a rotating magnetic storage medium including concentric tracks comprises providing a magnetoresistive (MR) sensor that reads information from a read track of the magnetic storage medium; providing first and second shields that have a length greater than two tracks in a track width direction and that define a gap therebetween; arranging the MR sensor in the gap; spacing inner magnetic portions of the first and second shields a first distance from the read track; and spacing outer magnetic portions of the first and second shields a second distance from adjacent tracks to the read track, wherein the first distance is less than the second distance.

In other features, the method includes arranging outer non-magnetic portions between the outer magnetic portions and the adjacent tracks. The method includes spacing the outer non-magnetic portions the first distance from the adjacent tracks. The inner magnetic portions comprise a projection and the outer magnetic portions define a concave surface relative to a direction of the projection. A thickness of inner edges of the outer magnetic portions adjacent to the inner magnetic portions is one of greater than or less than a thickness of outer edges of the outer magnetic portions. The inner portions include a projection and the first and second shields include a first side that faces the read track and second and third sides that face the inner and the outer magnetic portions of the adjacent tracks. The inner magnetic portions have a trapezoidal shape in a disk-facing direction. Circumferential sides of the trapezoid slope inwardly towards the MR sensor and cross an inner circumference side of an outer adjacent track and an outer circumference side of an inner adjacent track. The magnetic storage medium has perpendicular anisotropy. The magnetic storage medium includes shield portions that are radially offset from and arranged between adjacent tracks.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
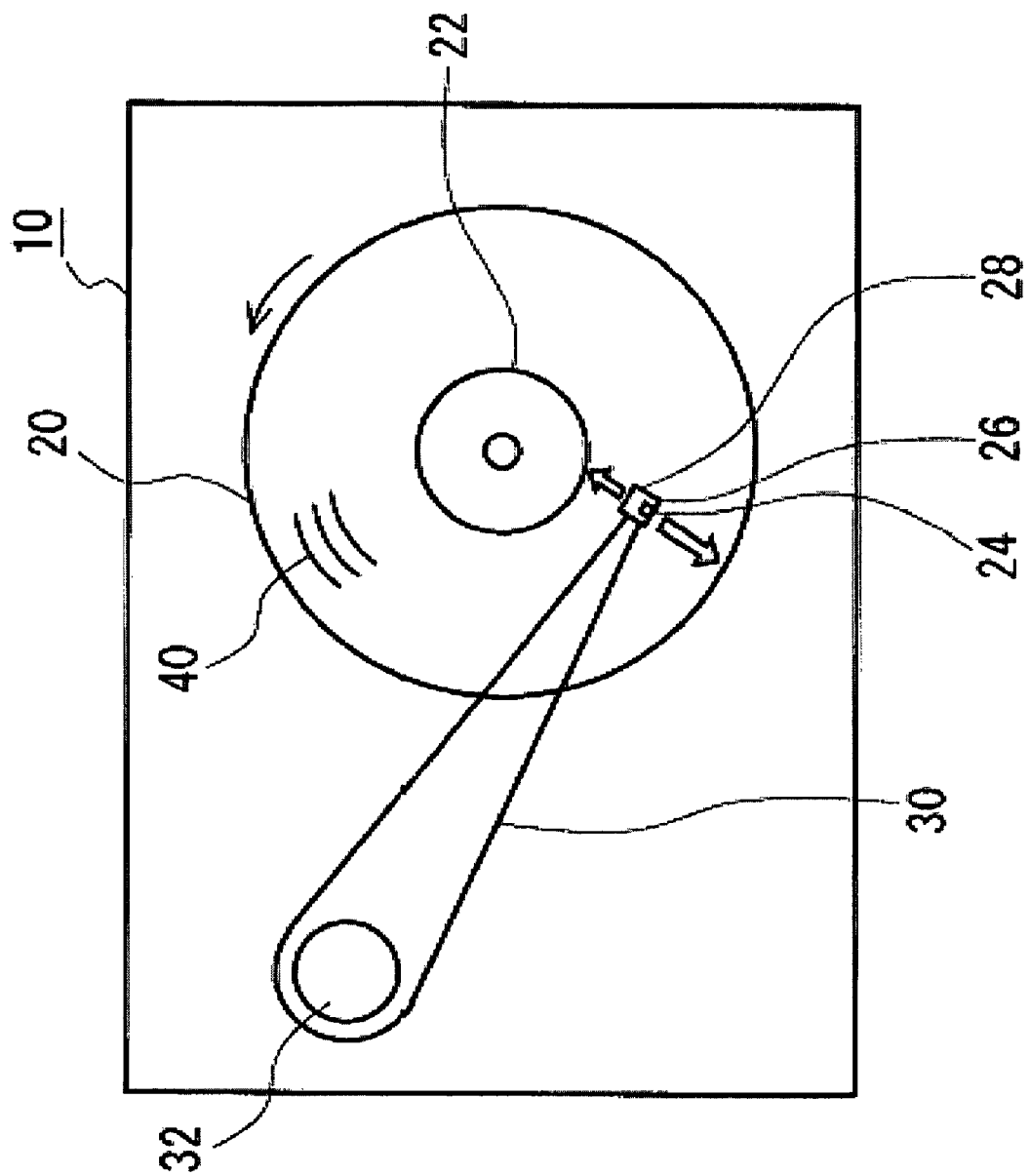
FIG. 1 illustrates a rotating magnetic storage system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
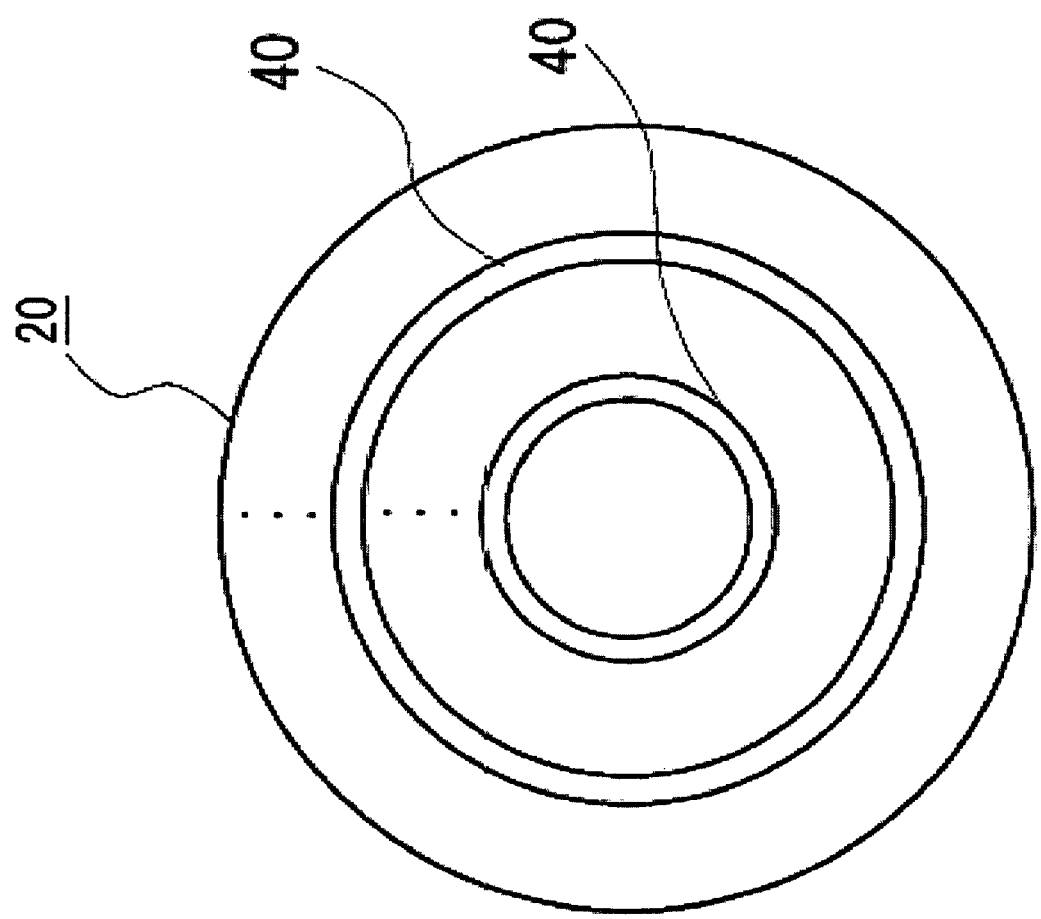
FIG. 2 illustrates concentric tracks of a magnetic storage medium.

Referring now to FIGS. 1 and 2, an exemplary rotating magnetic storage system 10 is shown. The rotating magnetic storage system 10 reads and writes data on concentric tracks of a magnetic storage medium 20. For example, the rotating magnetic storage system 10 may operate as a mass data storage device for a computer or other electronic device. The rotating magnetic storage system 10 includes the magnetic storage medium 20, a spindle motor 22, a write head 24, a read head 26, a slider 28, an arm 30 and an arm actuator 32.

The magnetic storage medium 20 includes a plurality of tracks 40 concentrically arranged thereon. Digital information is magnetically recorded along the tracks 40. The spindle motor 22 rotates the magnetic storage medium 20 during reading and writing.

The write head 24 records information on a track 40. The read head 26 reads the information recorded on a track 40. For example, parallel or perpendicular recording may be used. The slider 28 holds the write head 24 and the read head 26. The write head 24 and the read head 26 are arranged on the surface of the slider 28 facing a recording surface of the magnetic storage medium 20.

The arm 30 moveably adjusts the slider 28 in a radial direction of the magnetic storage medium 20 to position the write head 24 and the read head 26. For example, the arm 30 may be centered on a track 40 and/or adjusted from the innermost circumference side to the outermost circumference side of a track 40. The arm actuator 32 drives the arm 30 to move the write head 24 and the read head 26 to a position facing the track 40 targeted for writing or reading.

The rotating magnetic storage system 10 may include a plurality of magnetic storage media 20 rotationally driven at the same time by the spindle motor 22. A plurality of sliders 28, arms 30 and/or arm actuators 32 may be provided for each of the plurality of magnetic storage medium 20.

Figure 3:
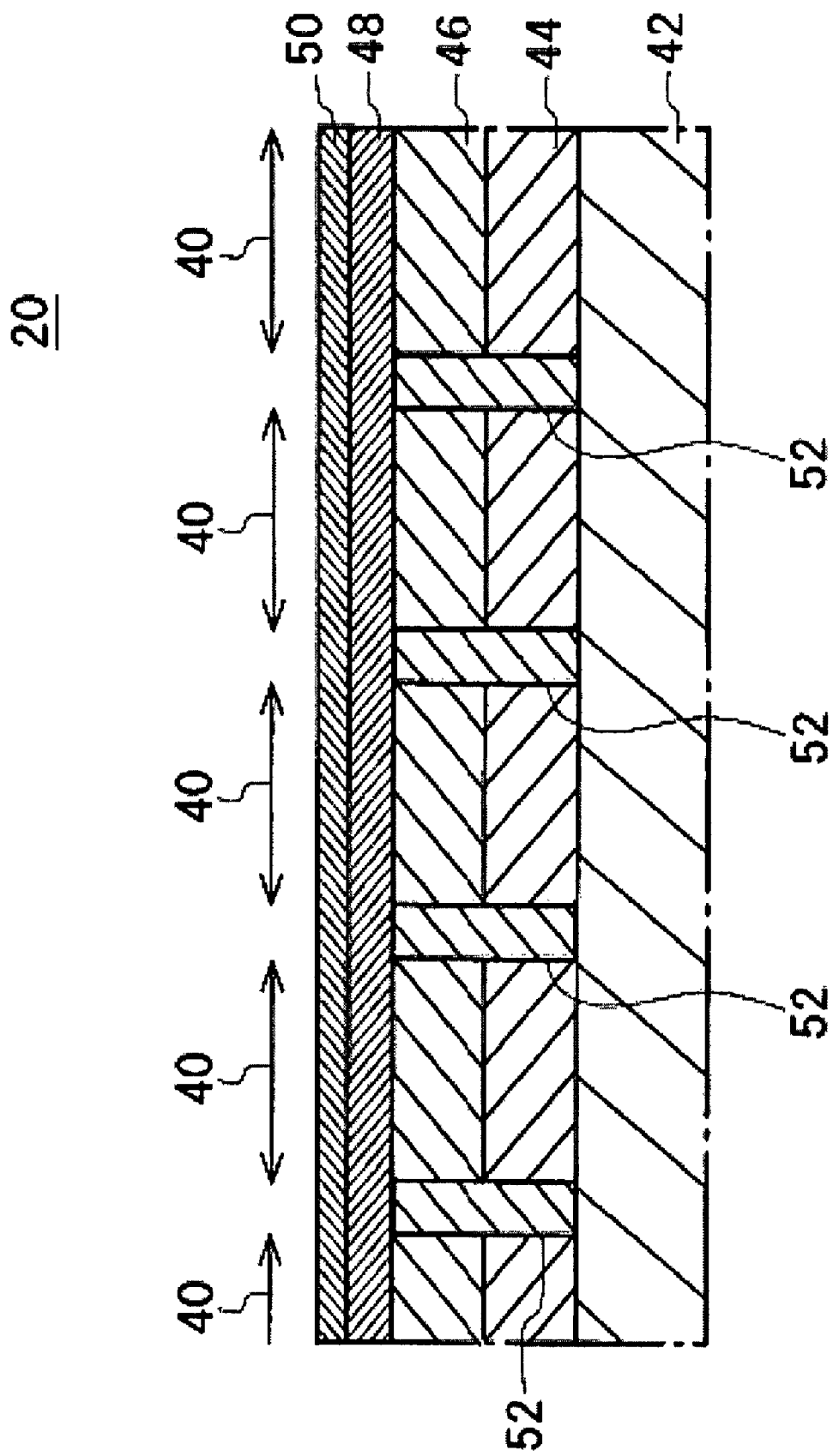
FIG. 3 is a cross-sectional view of the magnetic storage medium.

Referring now to FIG. 3, an exemplary cross-section of the magnetic storage medium 20 is shown. The magnetic storage medium 20 is formed of a disk or thin plate having a circular major surface as shown in FIG. 2. The magnetic storage medium 20 comprises a substrate 42, a soft magnetic material layer 44, a magnetic material layer 46, a protective layer 48, a lubricating layer 50 and shield portions 52. The substrate 42 may be formed of a disk. The substrate 42 may be made of glass or aluminum, for example.

For example only, the soft magnetic material layer 44 may be arranged on the substrate 42 by sputtering or other suitable methods. The soft magnetic material layer 44 may be made of soft magnetic material or high permeability material. For example only, the soft magnetic material layer 44 may be made of NiFe. The soft magnetic material layer 44 forms a part of a magnetic circuit. Magnetic flux that is output by the write head 24 passes through the magnetic material layer 46, through the magnetic material layer 46 again and returns to the write head 24.

For example only, the magnetic material layer 46 may be arranged on the soft magnetic material layer 44 by sputtering or other suitable methods. Each track 40 is formed on the magnetic material layer 46. The magnetic material layer 46 may have perpendicular anisotropy so as to be magnetized perpendicularly. For example only, the magnetic material layer 46 may be made of CoCrPt. The magnetic material layer 46 may be magnetized in the direction of the perpendicular anisotropy (upwardly or downwardly) by applying a perpendicular magnetic field. Additionally, the magnetic material layer 46 remains in the magnetized state after applying the magnetic field.

The protective layer 48 may be arranged on the magnetic material layer 46 using sputtering or other suitable methods. For example only, the protective layer 48 may be made of carbon material. The protective layer 48 reduces damage to the soft magnetic material layer 44 and the magnetic material layer 46 after contact between the write head 24 and the read head 26 and the magnetic storage medium 20. The lubricating layer 50 may be coated on the protective layer 48 or arranged using other suitable methods. For example only, the lubricating layer 50 may be perfluoropolyether. The lubricating layer 50 reduces friction between the write head 24 and the read head 26 and the magnetic storage medium 20.

Shield portions 52 may provide a shield between the magnetic material of adjacent tracks. The shield portions 52 may be arranged concentrically with a nonmagnetic material having a magnetic permeability that is lower than that of the magnetic material. For example only, the shield portions 52 may be made of SiO$_2$. The shield portions 52 may be formed by etching an opening between each of the tracks 40. The shield portion 52 can be arranged in the opening portion using sputtering or other suitable methods.

The shield portions 52 provide a magnetic shield between the track 40 and the adjacent tracks 40. During reading, the shield portion 52 reduces the magnetic flux generated from the adjacent tracks 40. This reduces the crosstalk noise input to the read head 26. For example, noise having a frequency that is lower than a predetermined frequency may be blocked. Therefore, the crosstalk noise will not be added to the voltage waveform from the track adjacent to the track being read. The shield portion 52 reduces crosstalk noise in the reproduced signal from the adjacent track 40.

Figure 11:
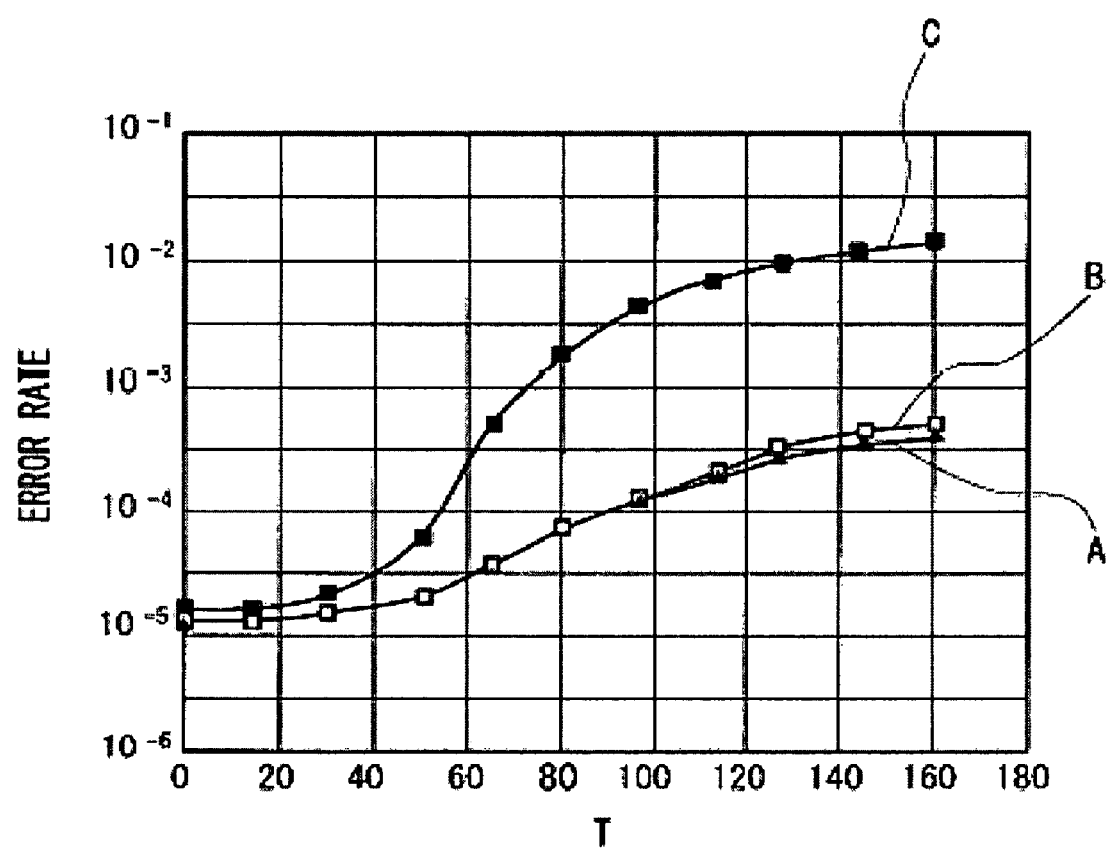
FIG. 11 is a graph illustrating an error rate of the signal including a DC component read from a read track relative to run length.

Additionally, each shield portion 52 may include nonmagnetic material formed in a groove having a depth more than half of the width of a track. Additionally, the error rate of the signal reproduced by the read head 26 is significantly increased when the run length of the adjacent track is more than 50 as shown in FIG. 11. Accordingly, the shield portion 52 can sufficiently reduce the leakage of the magnetic field applied from the adjacent track to the read head 26 by reducing the low-frequency noise having the frequency for which run length is more than 50, which is generated from the adjacent track.

Additionally, each of the shield portions 52 may include nonmagnetic material having a predetermined depth in order to limit the effect of the low-frequency noise having a frequency less than 1% of a read head sampling frequency. The shield portions 52 according to the present embodiment can sufficiently reduce the leakage of the magnetic field applied from the adjacent track to the read head 26 by reducing the low-frequency noise having the frequency less than 1% of the sampling frequency. For example, this frequency may correspond to run lengths greater than 50 on the adjacent track.

Figure 4:
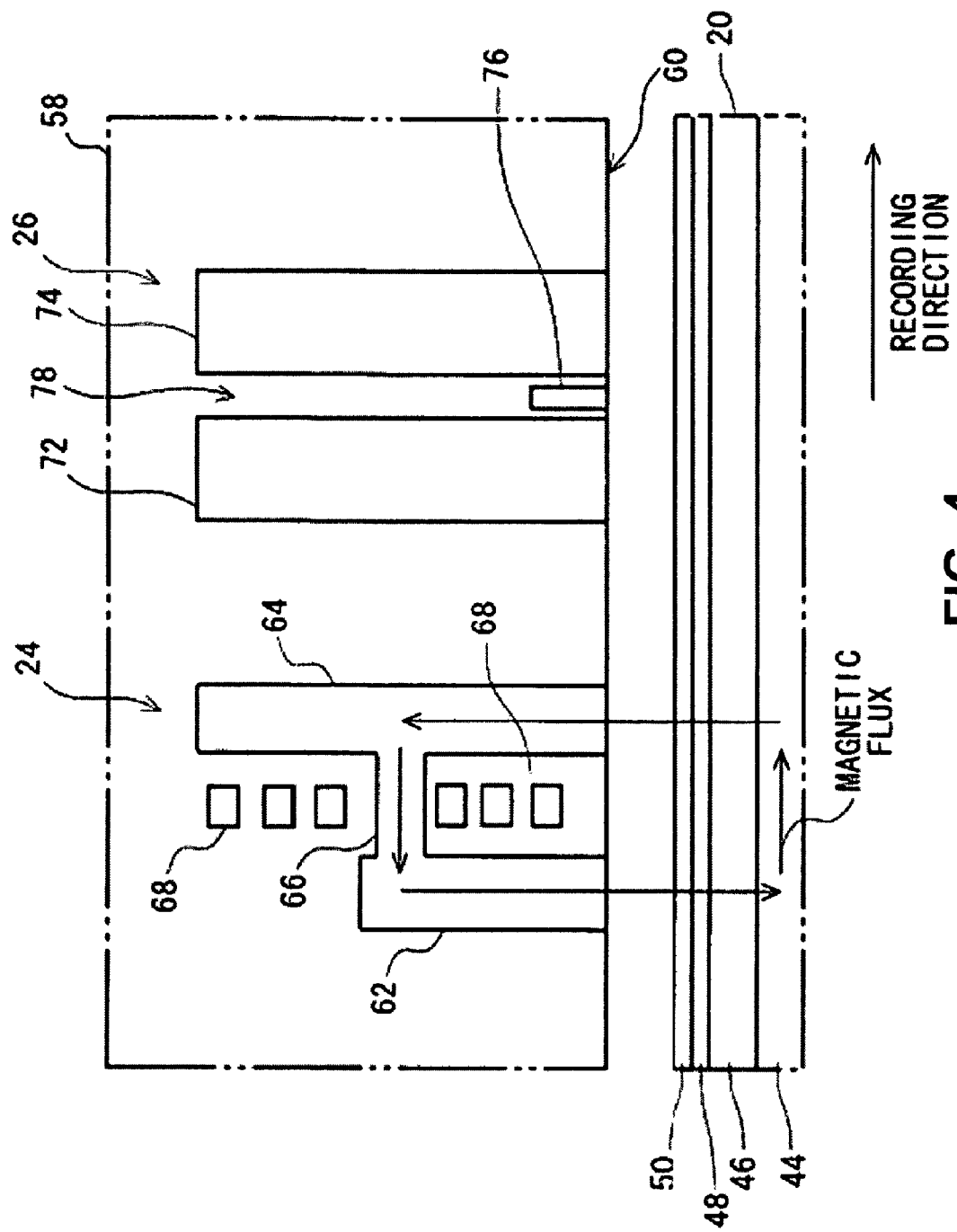
FIG. 4 illustrates a write head and a read head according to the present disclosure.

Referring now to FIG. 4, an exemplary configuration of the write head 24 and the read head 26 is shown. For example only, the write head 24 may be integrally formed in an slider substrate 58 of the slider 28. The write head 24 may be formed on the surface facing the magnetic storage medium 20 (a disk-facing surface 60) in the slider substrate 58 such that a part of the write head 24 is expose to the disk-facing surface 60.

For example only, the write head 24 may include a recording magnetic pole 62, a return magnetic pole 64, a magnetic yoke 66 and a recording coil 68. The recording magnetic pole 62 and the return magnetic pole 64 may comprise a thin film of high permeability magnetic material arranged substantially perpendicular to the major surface of the magnetic storage medium 20. The recording magnetic pole 62 and the return magnetic pole 64 may be arranged in the recording direction of the magnetic storage medium 20. The end surface on the disk-facing surface 60 side for each of the recording magnetic pole 62 and the return magnetic pole 64 may be exposed to the disk-facing surface 60.

The magnetic yoke 66 may comprise a thin film of high permeability magnetic material arranged substantially perpendicular to the major surface of the magnetic storage medium 20. The magnetic yoke 66 connects the recording magnetic pole 62 and the return magnetic pole 64 at a predetermined position inside the slider substrate 58 from the disk-facing surface 60. The recording coil 68 is wound substantially around the magnetic yoke 66.

In the write head 24, a recording current is applied to the recording coil 68 during recording. When the recording current is applied, a magnetic flux indicated by the arrow as shown in FIG. 4 passes through the magnetic circuit including the recording magnetic pole 62, the return magnetic pole 64, the magnetic yoke 66 and the soft magnetic material layer 44 facing the write head 24. As a result, the perpendicular magnetic flux passes through the magnetic material layer 46 arranged on the position facing the write head 24. The magnetic material layer 46 is magnetized in the direction of the magnetic flux.

For example only, the read head 26 may be integrally formed in the slider substrate 58 of the slider 28. The read head 26 may be formed on the surface facing the magnetic storage medium 20 such that a part of the read head 26 is exposed to the disk-facing surface 60.

The read head 26 includes a first shield 72, a second shield 74 and a magnetoresistive (MR) sensor 76. The first shield 72 and the second shield 74 are made of high permeability magnetic material arranged substantially perpendicular to the major surface of the magnetic storage medium 20 as shown in FIG. 4. The first shield 72 and the second shield 74 define a gap 78 having a predetermined width therebetween in the recording direction of the magnetic storage medium 20. Additionally, the end surface on the disk-facing surface 60 side for each of the first shield 72 and the second shield 74 may be exposed to the disk-facing surface 60. The first shield 72 and the second shield 74 can reduce the magnetic flux other than that in the perpendicular direction from being passed through the gap 78.

Figure 5A:
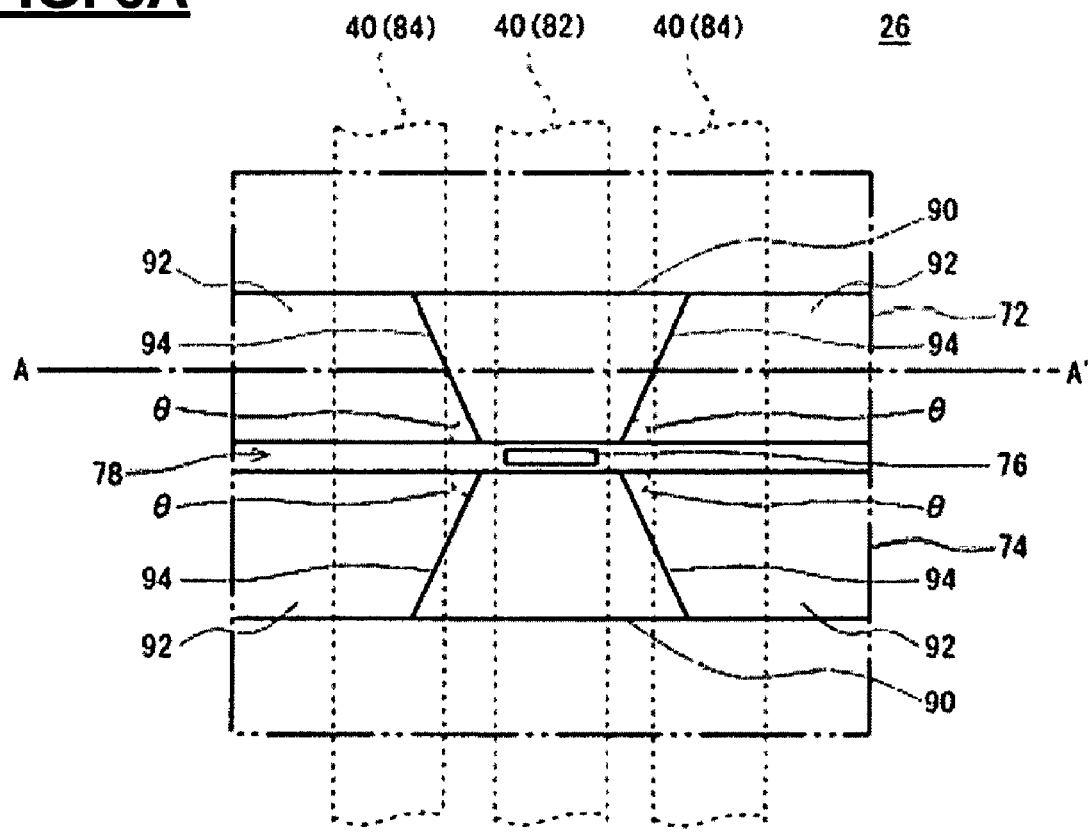
FIG. 5A illustrates the read head from a disk-facing surface side.
Figure 5B:
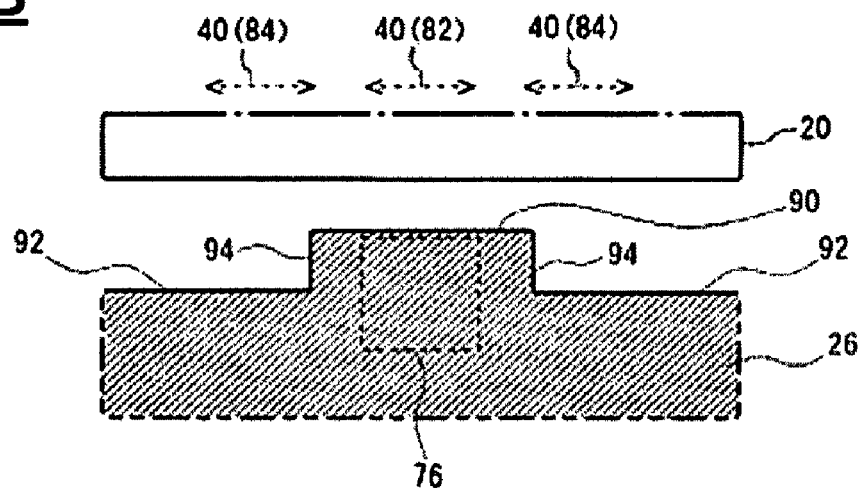
FIG. 5B is a cross-section view taken along A-A' in FIG. 5A.

Referring now to FIG. 5A, the read head 26 from a disk-facing surface 60 side is shown. Referring now to FIG. 5B, a cross-section along A-A' of FIG. 5A is shown. When the read head 26 is moved onto a track 82 targeted for reading, the end surface exposed to the disk-facing surface 60 side faces at least a track 82 targeted for reading and the inner circumference side and the outer circumference side of tracks 84 adjacent to the track 82 targeted for reading.

The MR sensor 76 outputs a signal based on the intensity of applied magnetic field. The MR sensor 76 is arranged in a gap 78 between the first shield 72 and the second shield 74. During reading, the perpendicular magnetic field is sensed by the MR sensor 76. A resistance of the MR sensor 76 changes based on a direction of the applied perpendicular magnetic field. For example, the MR sensor 76 may be a GMR (Giant Magneto Resistive) or a TMR (Tunneling Magneto Resistive) sensor.

Additionally, the width of the track direction within which the MR sensor 76 can detect the magnetic field may have a length that is less than substantially one track. In other words, the MR sensor 76 may face the track targeted for reading 82 but may not face the inner circumference side and the outer circumference side of the adjacent tracks 84 when the read head is moved onto the track targeted for reading 82. When the read head 26 is moved onto the track targeted for reading 82, inner magnetic portions 90 of the shields 72 and 74 may be closer than outer magnetic portions 92 of the shields 72 and 74 as shown in FIG. 5B.

The width of the track width direction for the upper surface of the inner magnetic portion 90 may be reduced in proportion to the proximity to the MR sensor 76. In this case, angle $\theta$ between each of two border lines 94 which bounds between the upper surface of the inner magnetic portion 90 and the outer magnetic portion 92, and the gap 78 may be previously determined so that a part of the outer magnetic portion 92 is not positioned directly above the track targeted for reading 82 even if either of the innermost circumference of track 40 and the outermost circumference of track 40 is the track targeted for reading 82. The border line 94 may be a straight line. The inner magnetic portion 90 may be a trapezoid as viewed from the upper surface side.

The inner magnetic portions 90 may have a trapezoidal shape in a disk-facing direction. The circumferential sides of the trapezoid slope inwardly towards the MR sensor and bisect an inner circumference side of an outer adjacent track and an outer circumference side of an inner adjacent track.

Figure 6:
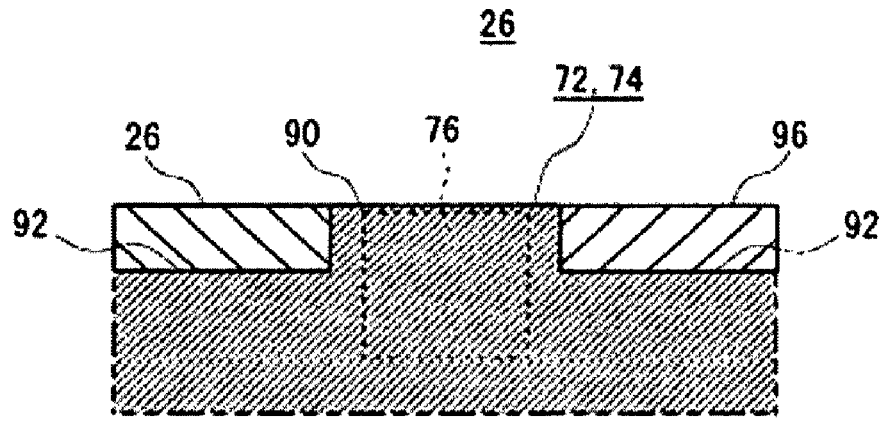
FIGS. 6-9 illustrate various exemplary cross-sectional views of the read head.

Referring now to FIG. 6, an exemplary cross-section of the read head 26 is shown. A nonmagnetic material 96A may be arranged between the outer magnetic portion 92 and the inner circumference side and the outer circumference side of adjacent tracks 84. In this case, a first distance between the nonmagnetic material layer 96 and the magnetic storage medium 20 may be substantially equal to a second distance between the inner magnetic portion 90 and the magnetic storage medium 20. Thereby the read head 26 can reduce the magnetic flux input from the adjacent track 84 to the MR sensor 76. Additionally, the read head 26 can disperse force applied to the inner magnetic portion 90 to other parts of the shields 72 and 74 to improve durability.

Figure 7:
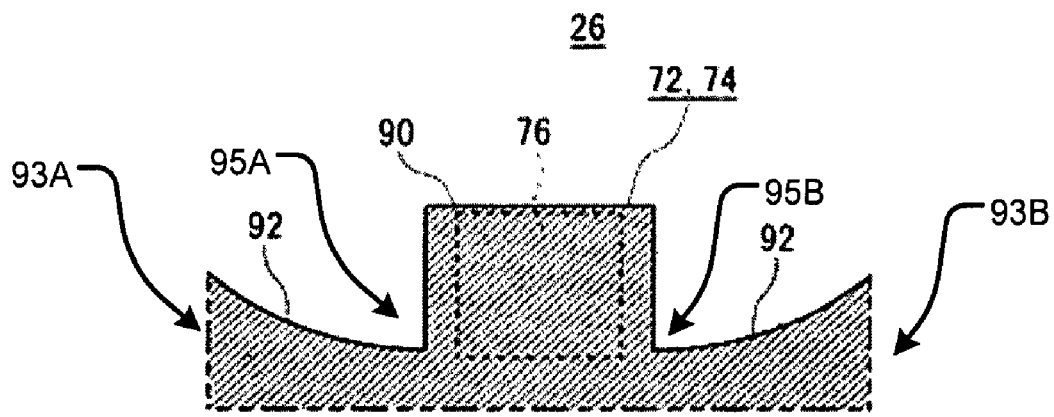
Figure 8:
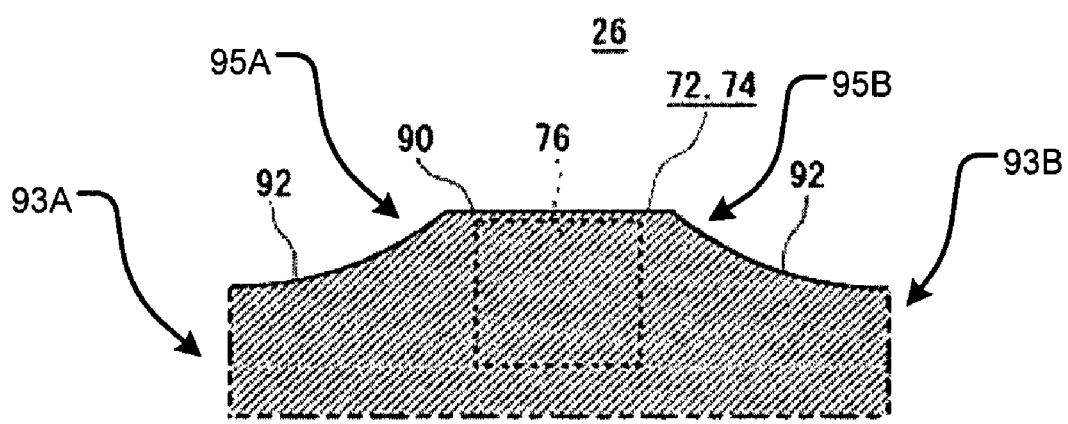
Figure 9:
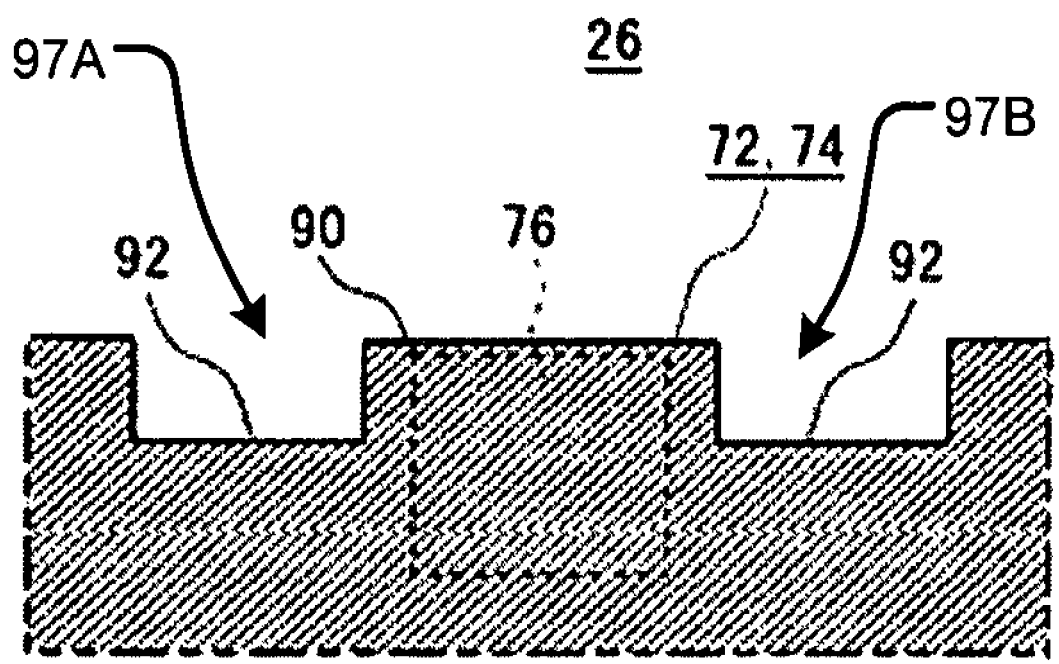

Referring now to FIGS. 7-9, other exemplary cross-sections of the read head 26 are shown. In FIG. 7, the shields 72 and 74 comprise the inner magnetic material that defines projections. The outer magnetic portions 92 define concave portions with respect to a direction of the projection. Outer edges 93A and 93B of the outer magnetic portions 92 may have a greater thickness than inner edges 95A and 95B adjacent to the inner magnetic portions 90. In FIG. 8, the shields 72 and 74 comprise the inner magnetic portions 90 that define projections. In this arrangement, outer edges 93A and 93B are thinner than inner edges 95A and 95B. The outer magnetic portions 92 curve away from the projections as shown. In FIG. 9, the inner magnetic portions 90 define projections. The outer magnetic portions 92 define notches 97A and 97B that may be arranged at a position facing the region including the adjacent tracks 84 or the region excluding the track targeted for reading 82. Outermost portions 99A and 99B of the shields 72 and 74 may project approximately the same distance as the projections defined by the inner magnetic portions 90. Still other variations are contemplated.

Figure 10:
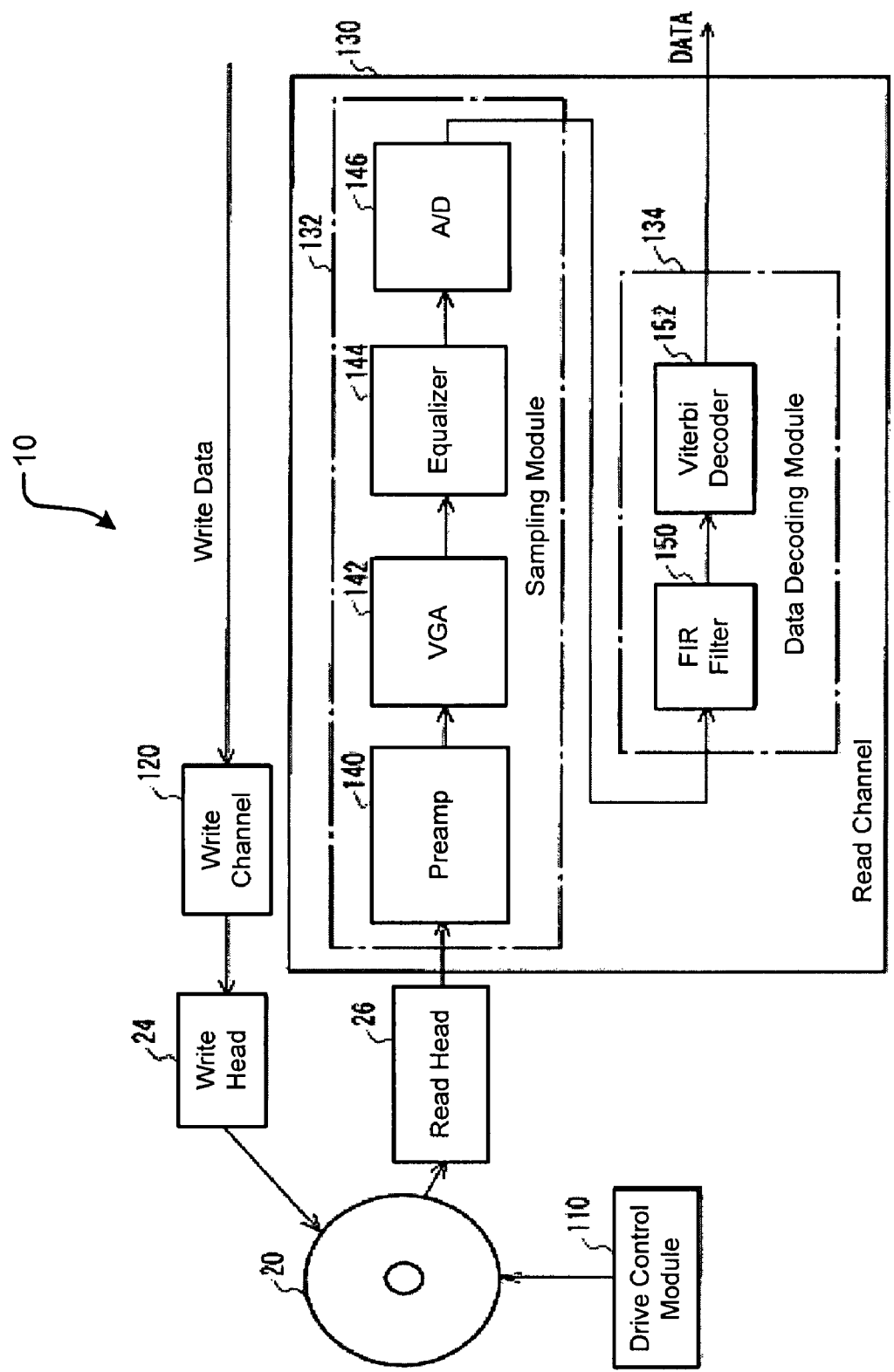
FIG. 10 is a functional block diagram of a signal processing system for the rotating magnetic storage system.

Referring now to FIG. 10, a functional block diagram of a signal processing system for the magnetic storage system is shown. The magnetic storage system 10 includes the write head 24, the read head 26, a drive control module 110, a write channel module 120, and a read channel module 130.

During reading and writing, the drive control module 110 performs rotational drive control and movement control to cause the arm 30 to move the write head 24 and the read head 26 to the position facing the track targeted for reading 40. The write channel module 120 inputs write data to be recorded on the magnetic storage medium 20 and generates a write signal based on the write data. Then, the writing module 120 outputs the write signal to the write head 24 and records the write data on the magnetic storage medium 20.

The reading module 130 includes a sampling module 132 and a data decoding module 134. The sampling module 132 samples the voltage waveform, which changes in response to the change of the electric resistance of the MR sensor 76 in the read head 26 during reading. The data decoding module 134 reproduces the data based on a shape of the voltage waveform sampled by the sampling module 132. The data decoding module 134 may sample the voltage waveform including the DC response of the sampled voltage waveform and reproduce the data based on the voltage waveform.

The sampling module 132 includes a preamplifier module 140, a variable gain amplifier (VGA) module 142, a waveform equalizing module 144 and an analog to digital (A/D) converting module 146. The preamplifier module 140 detects changes in resistance of the MR sensor 76 in the read head 26 and outputs a reproduced signal indicative of the change. The VGA module 142 amplifies the reproduced signal output by the preamplifier module 140.

The waveform equalizing module 144 equalizes the waveform output by the VGA module 142. The waveform equalizing module 144 may equalize the waveform using a PR (Partial Response) that is appropriate for the read head 26. The waveform equalizing module 144 may equalize the waveform including the DC response. In other words, the waveform equalizing module 144 equalizes the voltage waveform including the DC response of the resistance of the MR sensor 76 to reproduce the magnetized signal waveform on the magnetic storage medium 20. The A/D converting module 146 samples the analog reproduced signal with a predetermined sampling frequency to digitize and output a digital reproduced signal.

Additionally, the data decoding module 134 includes a finite impulse response (FIR) filter 150 and a Viterbi decoding module 152. The FIR filter 150 equalizes the digital reproduced signal output by the sampling module 132. The Viterbi decoding module 152 Viterbi decodes the equalized digital write signal to reproduce the data recorded on the track targeted for reading 40 of the magnetic storage medium 20 and outputs the same.

Referring now to FIG. 11, an error rate of the signal including the DC component is shown relative to the number of continuous same codes (run length T). The same codes are used when the pattern is recorded on the adjacent track. Graph A of FIG. 6 shows the error rate when the run length T of the pattern recorded on the inner circumference side of adjacent track of the track targeted for reading is varied. Graph B shows the error rate when the run length T of the pattern recorded on the outer circumference side of adjacent track of the track targeted for reading is varied. Graph C shows the error rate when the run length T of the pattern recorded on both of the inner circumference side of adjacent track and the outer circumference side of adjacent track of the track targeted for reading is changed.

The error rate increases when the run length T of the pattern recorded on the adjacent track is increased as shown FIG. 11. Then, when the run length T of the signal recorded on the adjacent track is increased, the frequency of crosstalk noise mixed in the reproduced signal from the adjacent track is more reduced. Accordingly, when the signal including the DC response is reproduced from the magnetic disc of the perpendicular magnetic recording method, the error rate is increased because the low-frequency crosstalk noise is mixed in the reproduced signal from the adjacent track.

Referring now to FIGS. 12A-12E, various exemplary implementations incorporating the teachings of the present disclosure are shown.

Figure 12B:
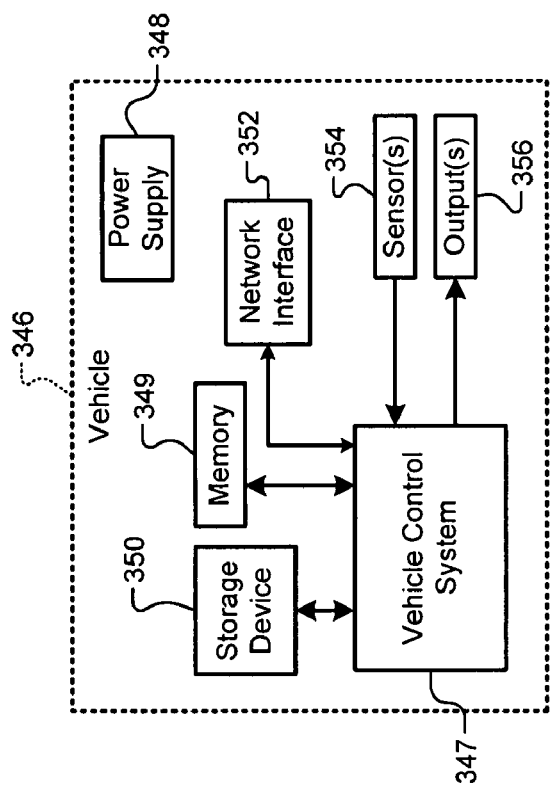
FIG. 12B is a functional block diagram of a vehicle control system.
Figure 12A:
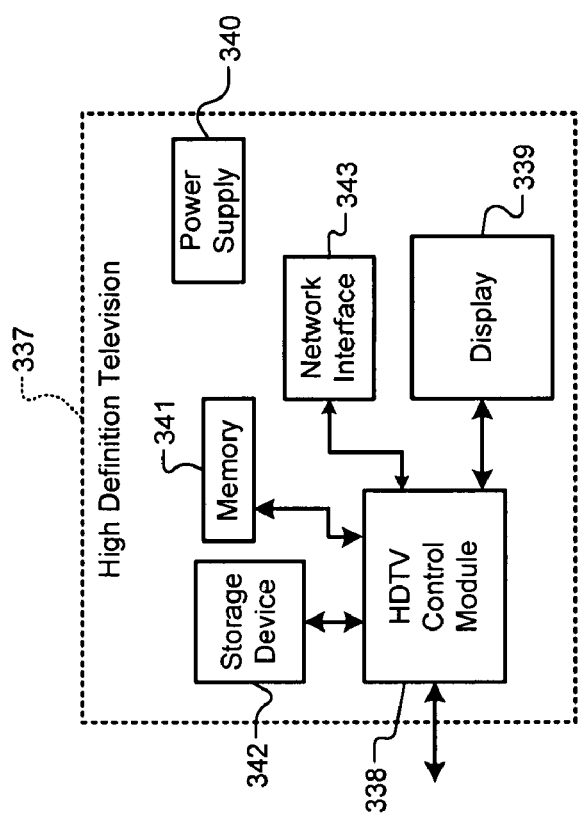
FIG. 12A is a functional block diagram of a high definition television.

Referring now to FIG. 12A, the teachings of the disclosure can be implemented in mass data storage of a high definition television (HDTV) 337. The HDTV 337 includes an HDTV control module 338, a display 339, a power supply 340, memory 341, a storage device 342, a network interface 343, and an external interface 345. If the network interface 343 includes a wireless local area network interface, an antenna (not shown) may be included.

The HDTV 337 can receive input signals from the network interface 343 and/or the external interface 345, which can send and receive data via cable, broadband Internet, and/or satellite. The HDTV control module 338 may process the input signals, including encoding, decoding, filtering, and/or formatting, and generate output signals. The output signals may be communicated to one or more of the display 339, memory 341, the storage device 342, the network interface 343, and the external interface 345.

Memory 341 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 342 may include an optical storage drive, such as a DVD drive, and/or a hard disk drive (HDD). The HDTV control module 338 communicates externally via the network interface 343 and/or the external interface 345. The power supply 340 provides power to the components of the HDTV 337.

Referring now to FIG. 12B, the teachings of the disclosure may be implemented in mass data storage of a vehicle 346. The vehicle 346 may include a vehicle control system 347, a power supply 348, memory 349, a storage device 350, and a network interface 352. If the network interface 352 includes a wireless local area network interface, an antenna (not shown) may be included. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 350 may include an optical storage drive, such as a DVD drive, and/or a hard disk drive (HDD). The vehicle control system 347 may communicate externally using the network interface 352.

Figure 12D:
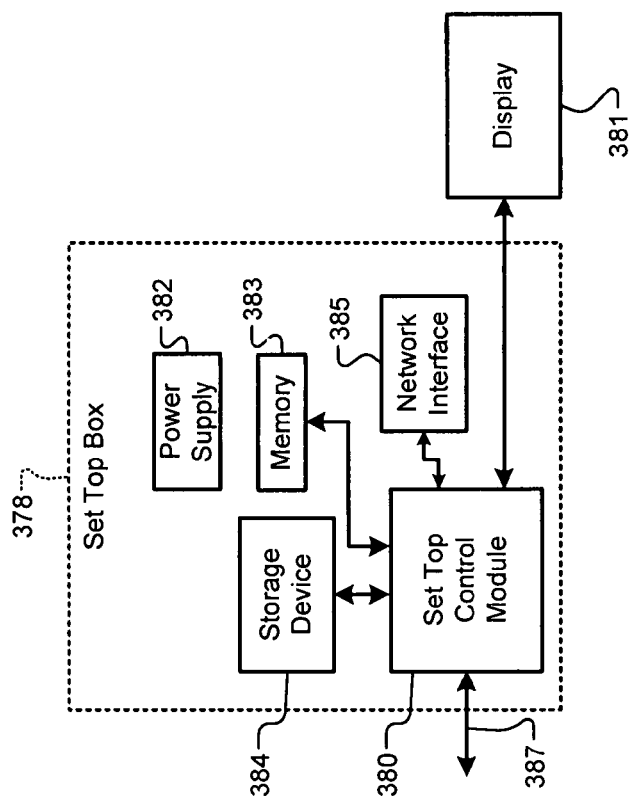
FIG. 12D is a functional block diagram of a set top box.
Figure 12C:
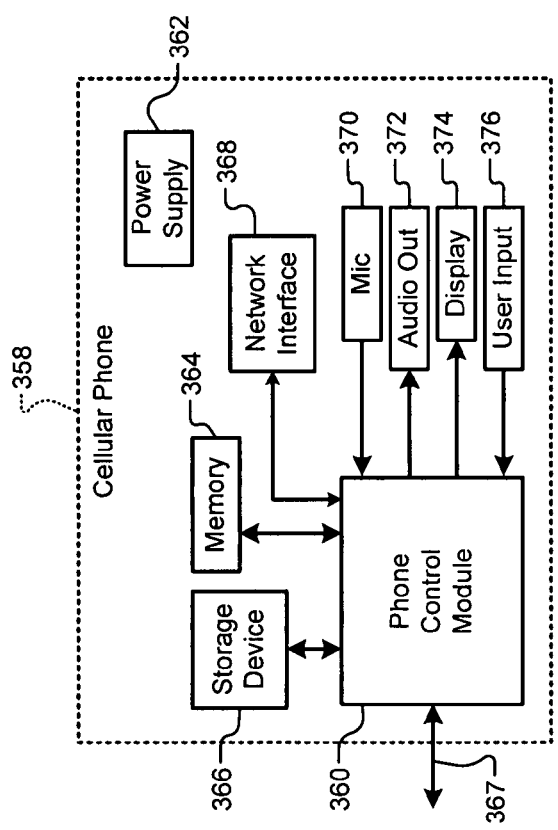
FIG. 12C is a functional block diagram of a cellular phone.

Referring now to FIG. 12C, the teachings of the disclosure can be implemented in mass data storage of a cellular phone 358. The cellular phone 358 includes a phone control module 360, a power supply 362, memory 364, a storage device 366, and a cellular network interface 367. The cellular phone 358 may include a network interface 368, a microphone 370, an audio output 372 such as a speaker and/or output jack, a display 374, and a user input device 376 such as a keypad and/or pointing device. If the network interface 368 includes a wireless local area network interface, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 366 may include an optical storage drive, such as a DVD drive, and/or a hard disk drive (HDD). The power supply 362 provides power to the components of the cellular phone 358.

Referring now to FIG. 12D, the teachings of the disclosure can be implemented in mass data storage of a set top box 378. The set top box 378 includes a set top control module 380, a display 381, a power supply 382, memory 383, a storage device 384, and a network interface 385. If the network interface 385 includes a wireless local area network interface, an antenna (not shown) may be included.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 384 may include an optical storage drive, such as a DVD drive, and/or a hard disk drive (HDD).

Figure 12E:
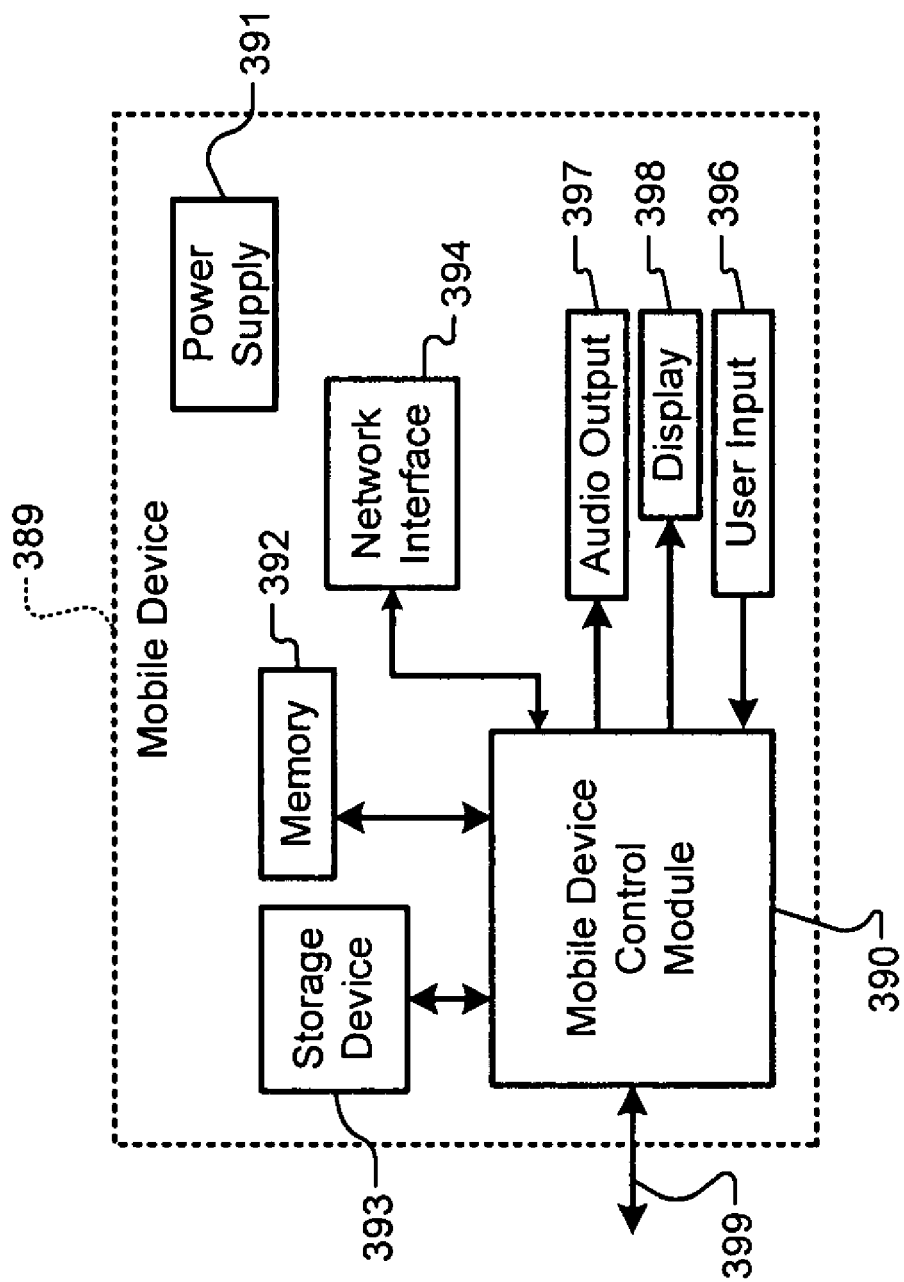
FIG. 12E is a functional block diagram of a mobile device.

Referring now to FIG. 12E, the teachings of the disclosure can be implemented in mass data storage of a mobile device 389. The mobile device 389 may include a mobile device control module 390, a power supply 391, memory 392, a storage device 393, a network interface 394, and an external interface 399. If the network interface 394 includes a wireless local area network interface, an antenna (not shown) may be included.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 393 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A read head for a rotating magnetic storage medium including concentric tracks, the read head comprising:
   a magnetoresistive (MR) sensor configured to read information from a read track of the magnetic storage medium; and
   first and second shields that have a length greater than two tracks in a track width direction and that define a gap therebetween, wherein the MR sensor is arranged in the gap,
   wherein inner magnetic portions of the first and second shields are spaced a first distance from the read track,
   wherein outer magnetic portions of the first and second shields are spaced a second distance from adjacent tracks to the read track, wherein the first distance and the second distance are perpendicular to a surface of the magnetic storage medium facing the first and second shields, and
   wherein the first distance is less than the second distance.

2. The read head of claim 1, wherein the inner magnetic portions comprise a projection and the outer magnetic portions define a concave surface relative to a direction of the projection.

3. The read head of claim 2, wherein a thickness of inner edges of the outer magnetic portions adjacent to the inner magnetic portions is one of greater than or less than a thickness of outer edges of the outer magnetic portions.

4. The read head of claim 1, wherein the inner magnetic portions have a trapezoidal shape in a disk-facing direction and wherein circumferential sides of the trapezoidal shape slope inwardly towards the MR sensor and cross an inner circumference side of an outer adjacent track and an outer circumference side of an inner adjacent track.

5. A read head for a rotating magnetic storage medium including concentric tracks, the read head comprising:
   a magnetoresistive (MR) sensor configured to read information from a read track of the magnetic storage medium; and
   first and second shields that have a length greater than two tracks in a track width direction and that define a gap therebetween, wherein the MR sensor is arranged in the gap,
   wherein inner magnetic portions of the first and second shields are spaced a first distance from the read track,
   wherein outer magnetic portions of the first and second shields are spaced a second distance from adjacent tracks to the read track,
   wherein the first distance is less than the second distance, and
   wherein the first and second shields further comprise outer non-magnetic portions that are arranged between the outer magnetic portions and the adjacent tracks.

6. The read head of claim 5, wherein the outer non-magnetic portions are spaced the first distance from the adjacent tracks.

7. A read head for a rotating magnetic storage medium including concentric tracks, the read head comprising:
   a magnetoresistive (MR) sensor configured to read information from a read track of the magnetic storage medium; and
   first and second shields that have a length greater than two tracks in a track width direction and that define a gap therebetween, wherein the MR sensor is arranged in the gap,
   wherein inner magnetic portions of the first and second shields are spaced a first distance from the read track,
   wherein outer magnetic portions of the first and second shields are spaced a second distance from adjacent tracks to the read track,
   wherein the first distance is less than the second distance, and
   wherein the inner portions include a projection and wherein the first and second shields include a first side that faces the read track and second and third sides that face the inner and the outer magnetic portions of the adjacent tracks.

8. A rotating magnetic storage system comprising said read head of claim 1 and further comprising:
   the magnetic storage medium;
   a write head configured to write information to a write track of the magnetic storage medium;
   a sampling module configured to sample a voltage waveform, which is based on a resistance of the MR sensor; and a read channel module configured to reproduce the information recorded on the read track based on the sampled voltage waveform.

9. A read head for a rotating magnetic storage medium including concentric tracks, the read head comprising:
   a magnetoresistive (MR) sensor configured to read information from a read track of the magnetic storage medium; and
   first and second shields that have a length greater than two tracks in a track width direction and that define a gap therebetween, wherein the MR sensor is arranged in the gap,
   wherein inner magnetic portions of the first and second shields are spaced a first distance from the read track,
   wherein outer magnetic portions of the first and second shields are spaced a second distance from adjacent tracks to the read track,
   wherein the first distance is less than the second distance, and
   wherein the magnetic storage medium has perpendicular anisotropy.

10. A read head for a rotating magnetic storage medium including concentric tracks, the read head comprising:
    a magnetoresistive (MR) sensor configured to read information from a read track of the magnetic storage medium; and
    first and second shields that have a length greater than two tracks in a track width direction and that define a gap therebetween, wherein the MR sensor is arranged in the gap,
    wherein inner magnetic portions of the first and second shields are spaced a first distance from the read track,
    wherein outer magnetic portions of the first and second shields are spaced a second distance from adjacent tracks to the read track,
    wherein the first distance is less than the second distance, and
    wherein the magnetic storage medium includes shield portions that are radially offset from and arranged between adjacent tracks.

11. A method for providing a read head for a rotating magnetic storage medium including concentric tracks, the method comprising:
    providing a magnetoresistive (MR) sensor that reads information from a read track of the magnetic storage medium;
    providing first and second shields that have a length greater than two tracks in a track width direction and that define a gap therebetween;
    arranging the MR sensor in the gap;
    spacing inner magnetic portions of the first and second shields a first distance from the read track; and
    spacing outer magnetic portions of the first and second shields a second distance from adjacent tracks to the read track, wherein the first distance and the second distance are perpendicular to a surface of the magnetic storage medium facing the first and second shields, and wherein the first distance is less than the second distance.

12. The method of claim 11, wherein the inner magnetic portions comprise a projection and the outer magnetic portions define a concave surface relative to a direction of the projection.

13. The method of claim 12, wherein a thickness of inner edges of the outer magnetic portions adjacent to the inner magnetic portions is one of greater than or less than a thickness of outer edges of the outer magnetic portions.

14. The method of claim 11, wherein the inner magnetic portions have a trapezoidal shape in a disk-facing direction and wherein circumferential sides of the trapezoidal shape slope inwardly towards the MR sensor and cross an inner circumference side of an outer adjacent track and an outer circumference side of an inner adjacent track.

15. A method for providing a read head for a rotating magnetic storage medium including concentric tracks, the method comprising:
    providing a magnetoresistive (MR) sensor configured to read information from a read track of the magnetic storage medium;
    providing first and second shields that have a length greater than two tracks in a track width direction and that define a gap therebetween;
    arranging the MR sensor in the gap;
    spacing inner magnetic portions of the first and second shields a first distance from the read track;
    spacing outer magnetic portions of the first and second shields a second distance from adjacent tracks to the read track, wherein the first distance is less than the second distance; and
    arranging outer non-magnetic portions between the outer magnetic portions and the adjacent tracks.

16. The method of claim 15, further comprising spacing the outer non-magnetic portions the first distance from the adjacent tracks.

17. A method for providing a read head for a rotating magnetic storage medium including concentric tracks, the method comprising:
    providing a magnetoresistive (MR) sensor configured to read information from a read track of the magnetic storage medium;
    providing first and second shields that have a length greater than two tracks in a track width direction and that define a gap therebetween;
    arranging said MR sensor in the gap;
    spacing inner magnetic portions of the first and second shields a first distance from the read track; and
    spacing outer magnetic portions of the first and second shields a second distance from adjacent tracks to the read track, wherein the first distance is less than the second distance,
    wherein the inner portions include a projection and wherein the first and second shields include a first side that faces the read track and second and third sides that face the inner and outer magnetic portions of the adjacent tracks.

18. A method for providing a read head for a rotating magnetic storage medium including concentric tracks, the method comprising:
    providing a magnetoresistive (MR) sensor configured to read information from a read track of the magnetic storage medium;
    providing first and second shields that have a length greater than two tracks in a track width direction and that define a gap therebetween;
    arranging said MR sensor in the gap;
    spacing inner magnetic portions of the first and second shields a first distance from the read track; and
    spacing outer magnetic portions of the first and second shields a second distance from adjacent tracks to the read track, wherein the first distance is less than the second distance,
    wherein the magnetic storage medium has perpendicular anisotropy.

19. A method for providing a read head for a rotating magnetic storage medium including concentric tracks, the method comprising:
- providing a magnetoresistive (MR) sensor configured to read information from a read track of the magnetic storage medium;
- providing first and second shields that have a length greater than two tracks in a track width direction and that define a gap therebetween;
- arranging the MR sensor in said gap;
- spacing inner magnetic portions of the first and second shields a first distance from the read track; and
- spacing outer magnetic portions of the first and second shields a second distance from adjacent tracks to the read track, wherein the first distance is less than the second distance,
- wherein the magnetic storage medium includes shield portions that are radially offset from and arranged between adjacent tracks.

* * * * *